INVENTORS
DANIEL S. CVACHO
DAVID H. HUSSEY

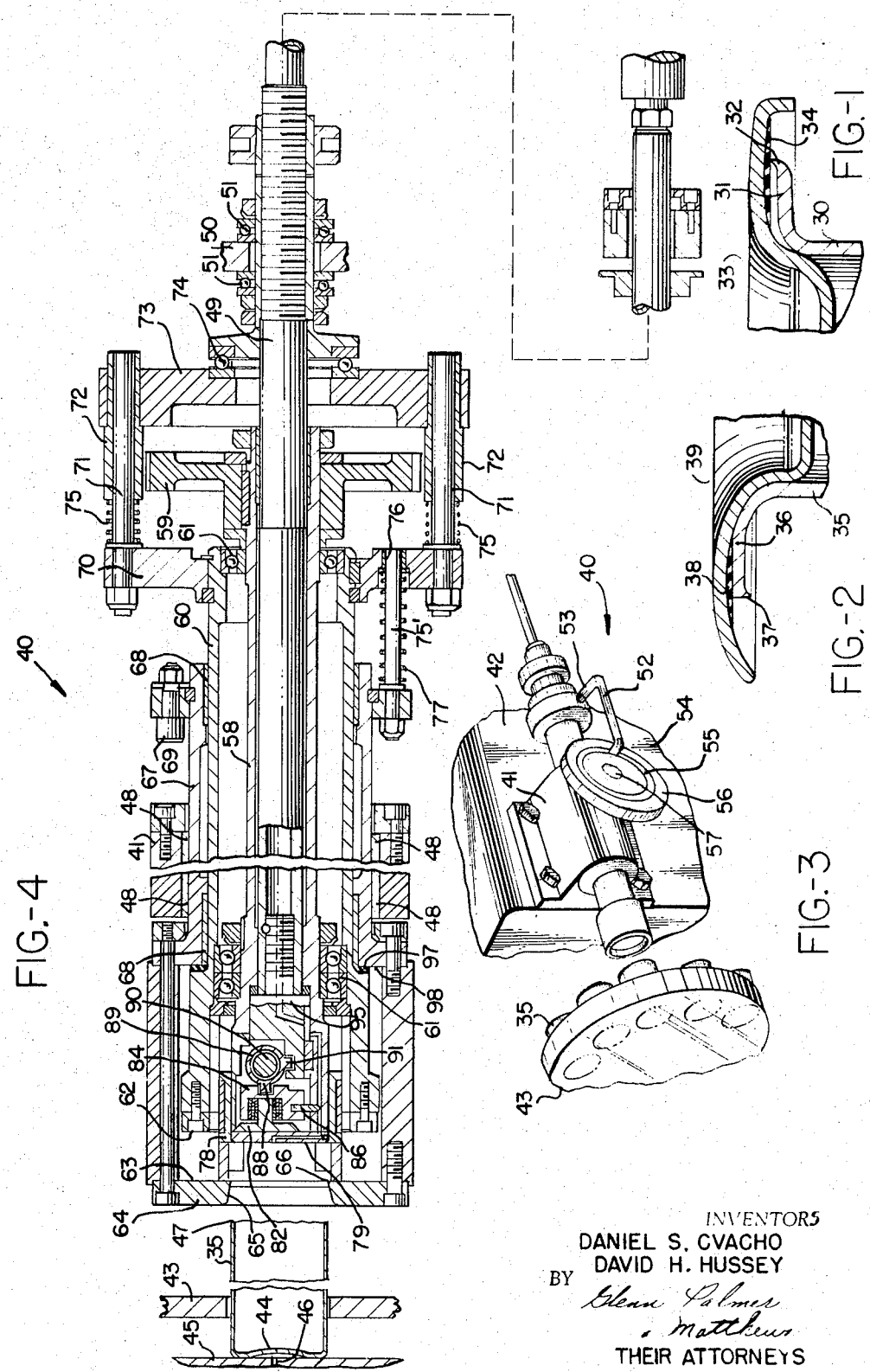

*Glenn, Palmer
& Matthews*

THEIR ATTORNEYS

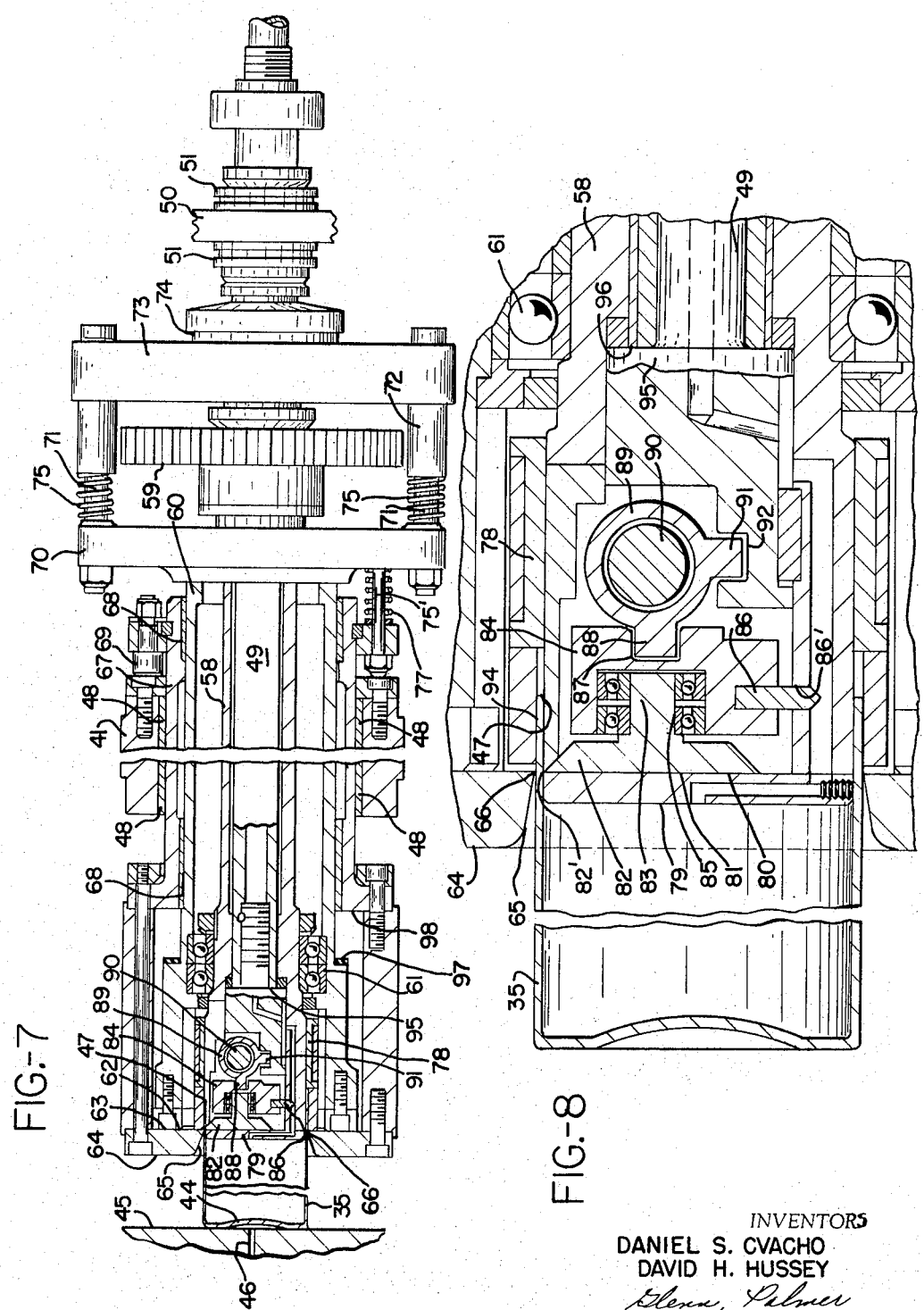

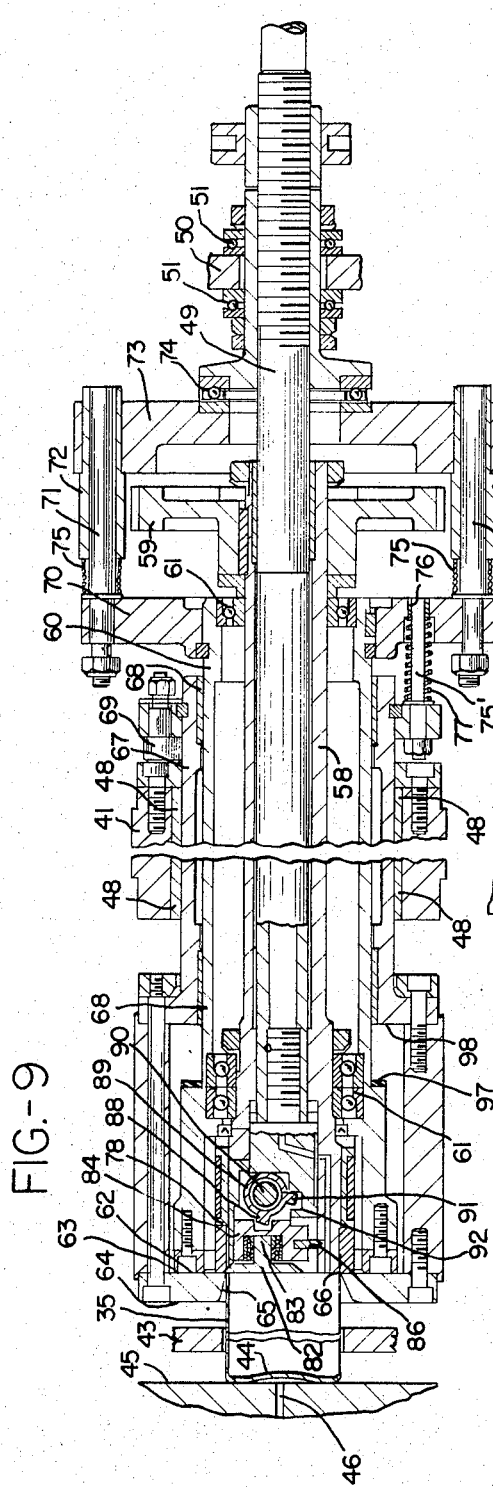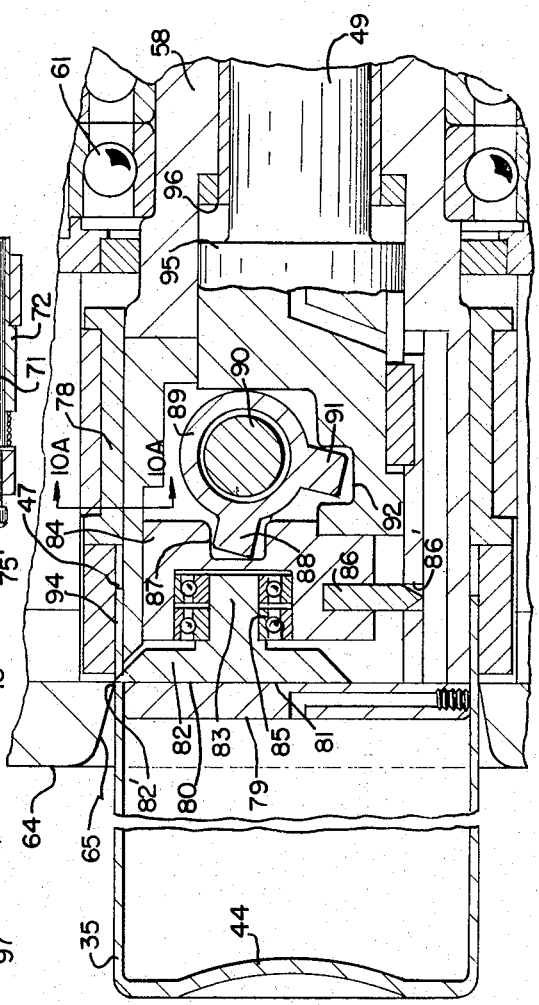

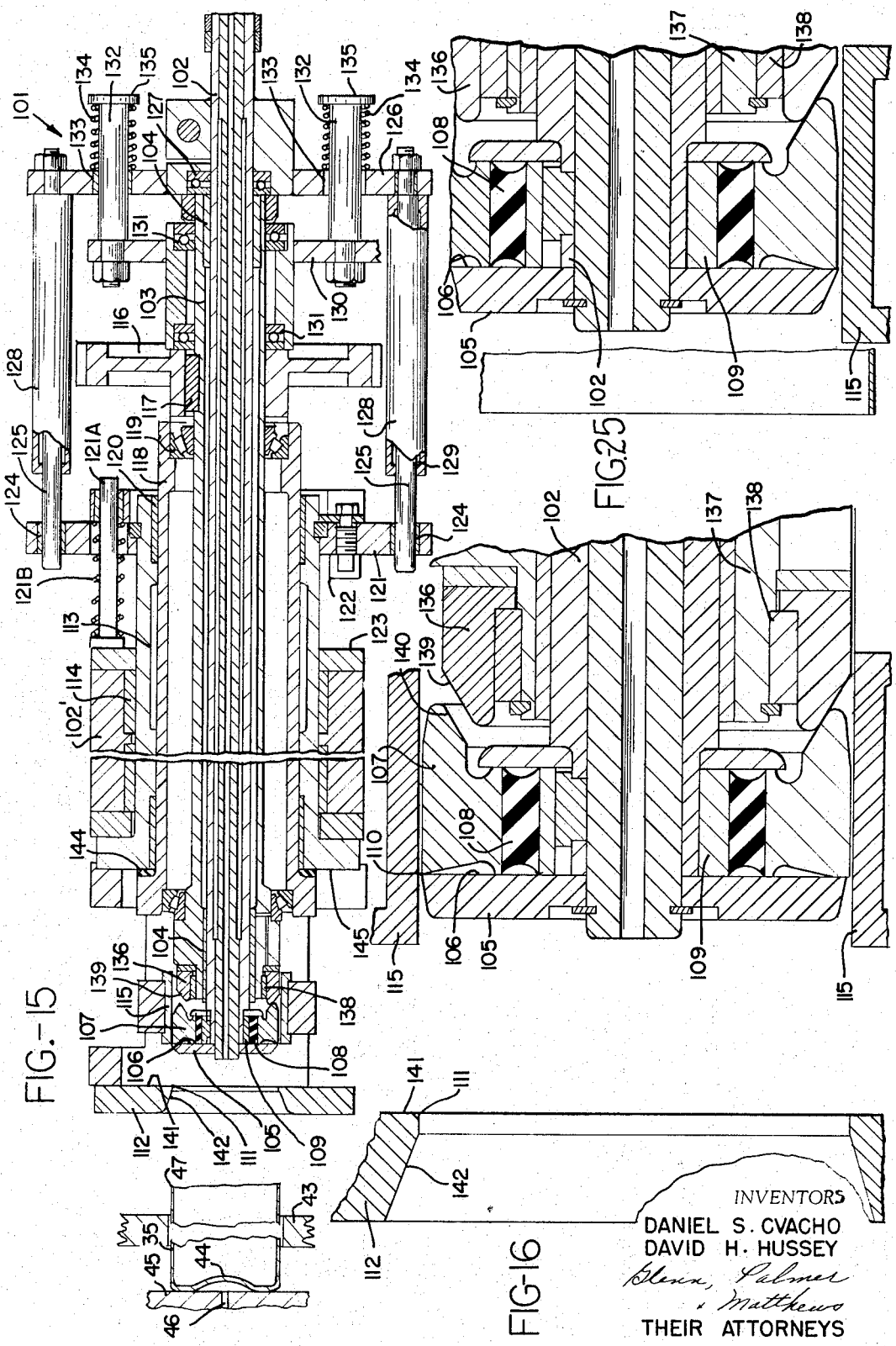

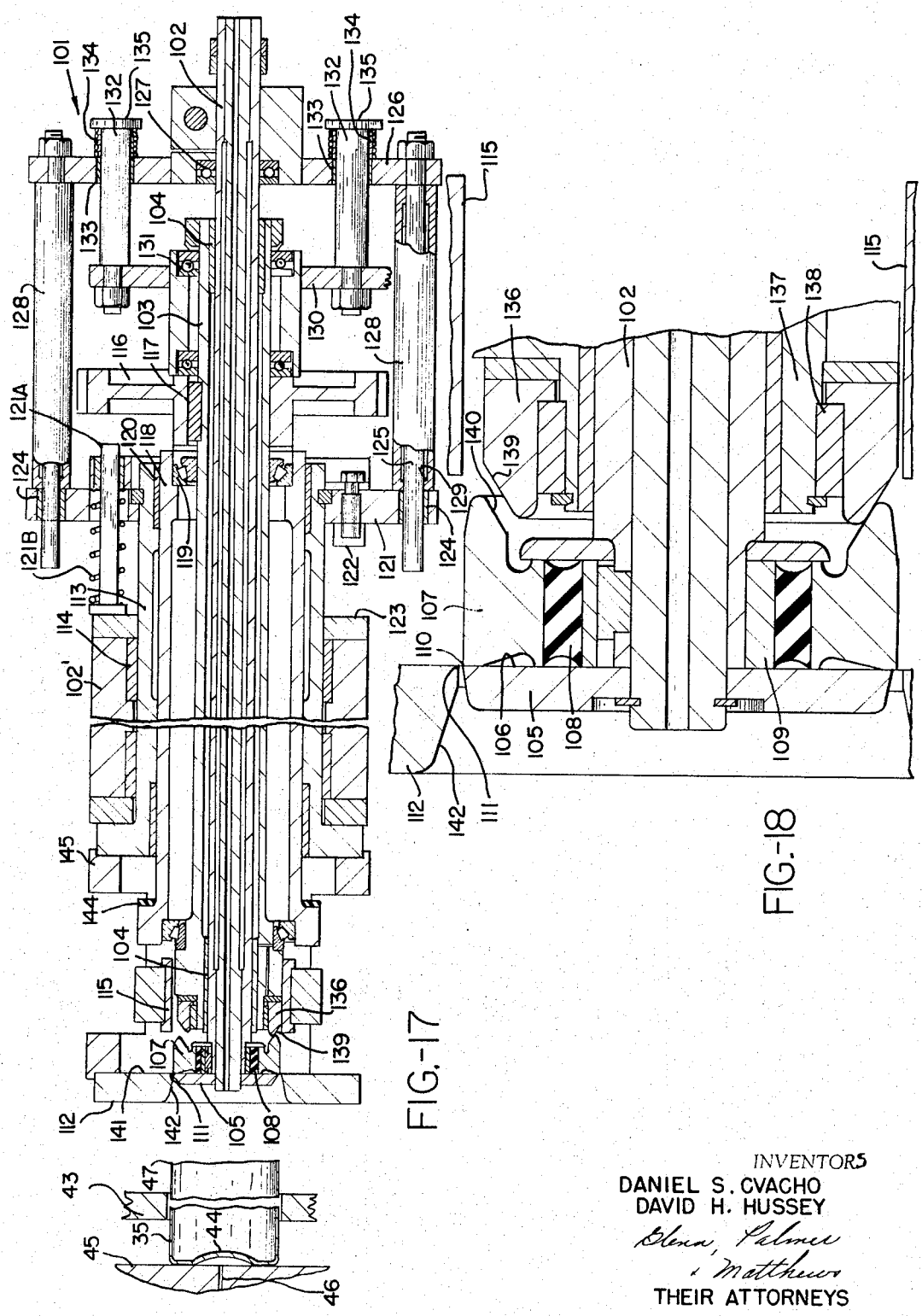

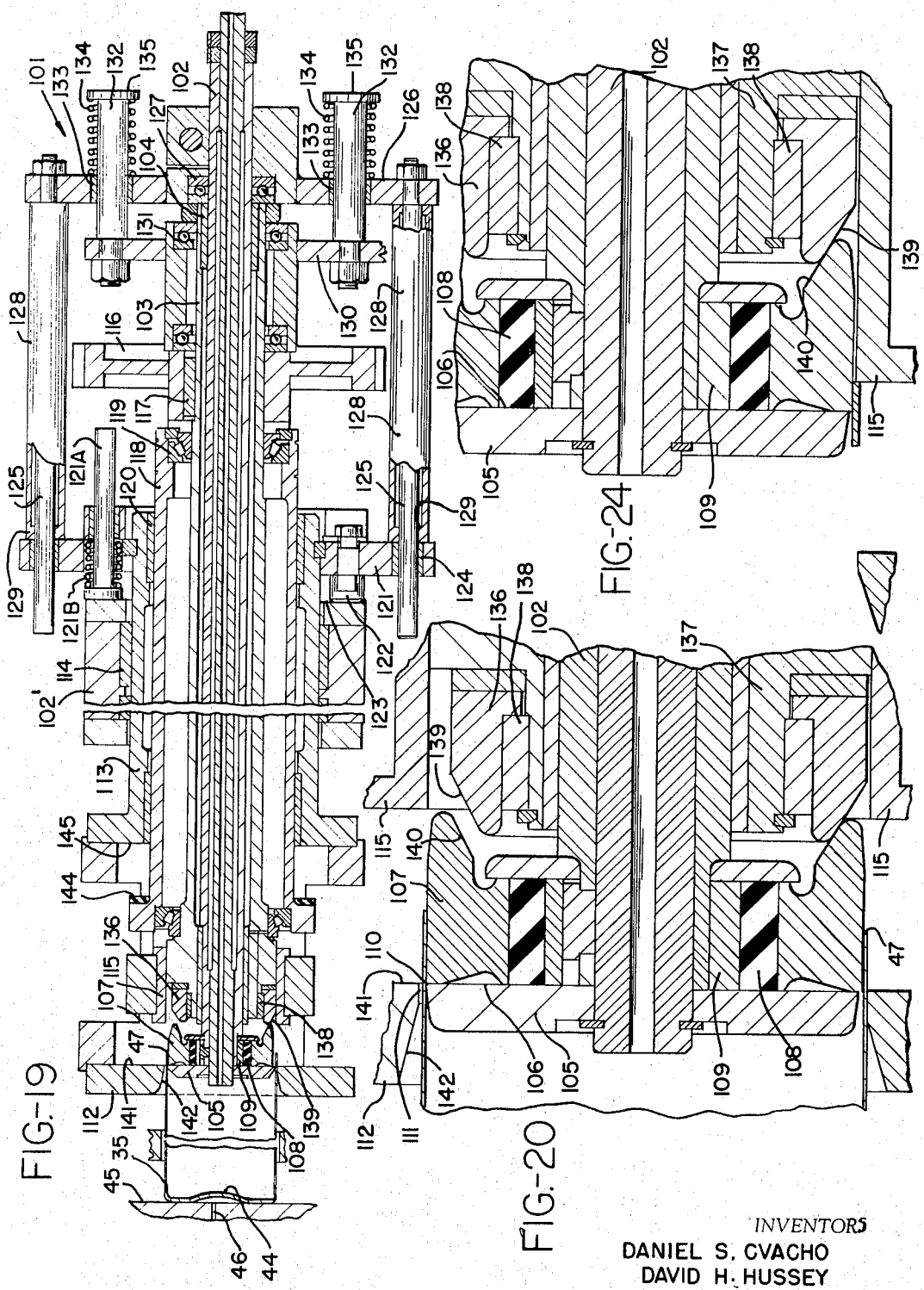

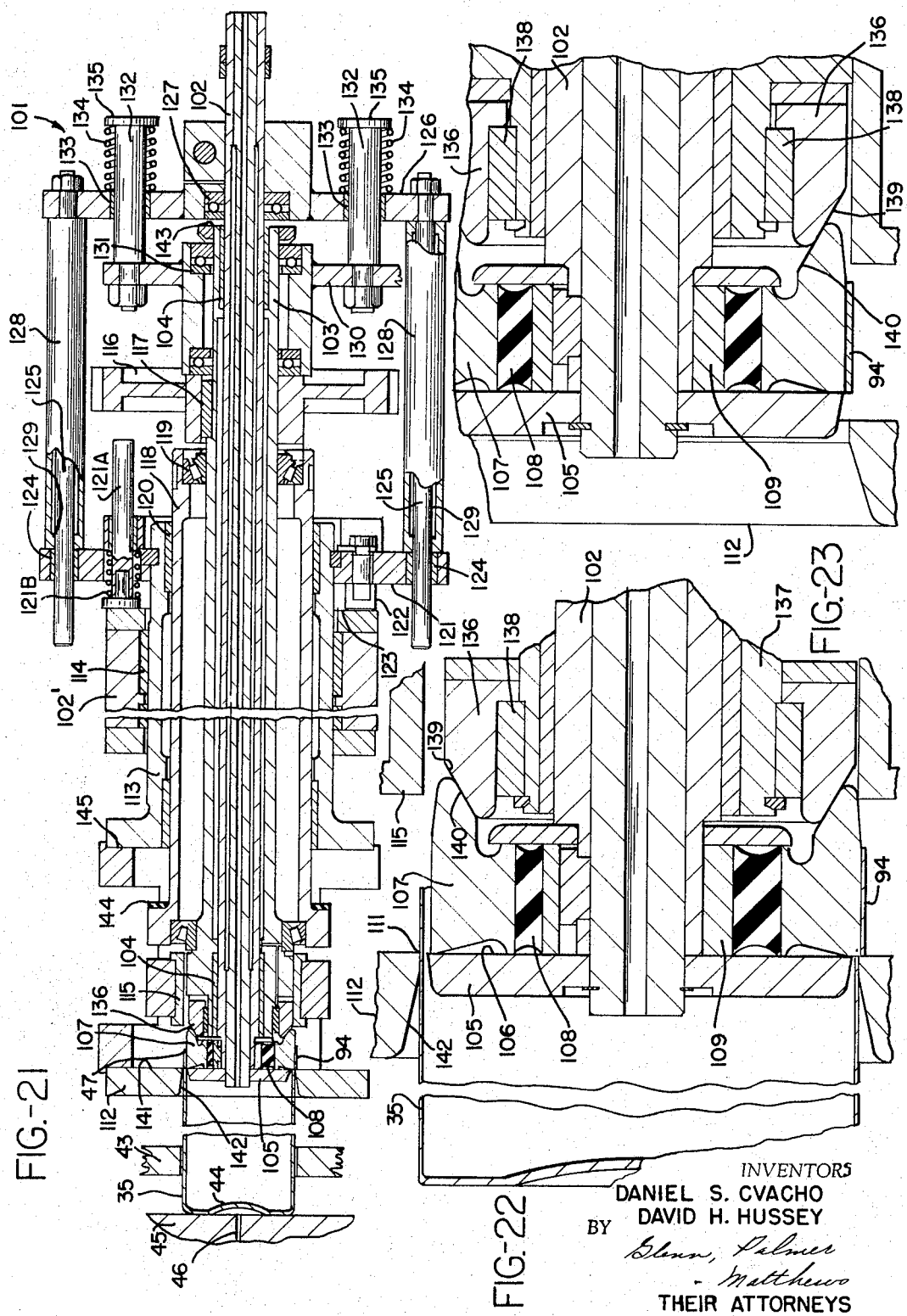

United States Patent Office 3,359,841
Patented Dec. 26, 1967

3,359,841
CONTAINER BODY TRIMMING APPARATUS
AND METHOD
Daniel S. Cvacho, Chesterfield, Va., and David H. Hussey, Orlando, Fla., assignors to Reynolds Metals Company, Richmond, Va., a corporation of Virginia
Filed Nov. 12, 1964, Ser. No. 410,698
26 Claims. (Cl. 82—82)

This invention relates to an improved apparatus and method for trimming an open end of a container body or the like.

In particular, it is well known that cup-shaped container bodies can be formed by drawing and ironing the same to the desired length and size from a cup-shaped blank of metallic material whereby the open end of the resulting cup-shaped container body has an irregular edge which must be subsequently trimmed so that the container body will have a height which will be uniform with other trimmed container bodies formed in a like manner.

However, in the past, such trimming of the container bodies has been accomplished by cutting the open end thereof from the exterior surface thereof into the interior surface thereof.

This prior known cutting means provided a burred edge which extended into the container body so that when the same was subsequently flanged to adapt itself to an end closure, the burr at the trimmed end thereof cut into the sealing compound or gasket carried on the closure and destroyed the effect of the same whereby the sealing qualities between the closure and the container body were greatly reduced.

However, according to the teachings of this invention, improved trimming means are provided wherein the container body has the open end thereof trimmed by means received in the container body so as to cut the same from the interior surface thereof to the exterior surface thereof whereby the resulting burr extends outwardly from the container body and will not adversely cut into the sealing compound or gasket on the closure subsequently utilized to close the trimmed end thereof.

Further, this invention provides the above trimming operation in such a manner, that each trimmed container body will have a uniform height or length.

Accordingly, it is an object of this invention to provide an improved apparatus for trimming an open end of a container body or the like, the apparatus of this invention having one or more of the novel features set forth above or hereinafter shown or described.

Another object of this invention is to provide an improved method of trimming an open end of a container body or the like, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a fragmentary, cross-sectional view illustrating the prior art container body and end closure therefor.

FIGURE 2 is a view similar to FIGURE 1 and illustrates the advantages of the trimmed container body of this invention in cooperation with the end closure therefor.

FIGURE 3 is a fragmentary perspective view illustrating one embodiment of this invention.

FIGURE 4 is a cross-sectional view illustrating the apparatus of FIGURE 3 in its normal non-cutting position.

FIGURE 7 is a view similar to FIGURE 4 and illustrates the apparatus of FIGURE 3 in another operating position thereof.

FIGURE 8 is an enlarged, fragmentary cross-sectional view of the operating parts illustrated in FIGURE 7.

FIGURE 9 is a view similar to FIGURE 4 and illustrates the apparatus of FIGURE 3 in its trimming position.

FIGURE 10 is an enlarged, fragmentary, cross-sectional view illustrating the trimming operation of the apparatus illustrated in FIGURE 9.

FIGURE 10A is a fragmentary, cross-sectional view taken on line 10A—10A of FIGURE 10 and illustrates the splined connection between the stripping means and the male die means.

FIGURE 15 is a view similar to FIGURE 4 and illustrates another trimming apparatus of this invention.

FIGURE 16 is an enlarged, fragmentary, cross-sectional view of the male and female die cutting members of FIGURE 15.

FIGURE 17 is a view similar to FIGURE 15 and illustrates the apparatus of FIGURE 15 in another operating position thereof.

FIGURE 18 is an enlarged, fragmentary, cross-sectional view of the male and female cutting members of FIGURE 17.

FIGURE 19 is a view similar to FIGURE 15 and illustrates the apparatus of FIGURE 15 in another operating position thereof.

FIGURE 20 is an enlarged, fragmentary, cross-sectional view of the operating parts of the apparatus illustrated in FIGURE 19.

FIGURE 21 is a view similar to FIGURE 15 and illustrates the apparatus of FIGURE 15 in its trimming position.

FIGURE 22 is an enlarged, fragmentary, cross-sectional view illustrating the trimming operation of FIGURE 21.

FIGURE 23 is a view similar to FIGURE 22 and illustrates the stripping operation of the apparatus of FIGURE 15.

FIGURES 24 and 25 are views similar to FIGURE 23 and illustrate how the stripped trim material is ejected from the apparatus of FIGURE 15.

Figure 5:
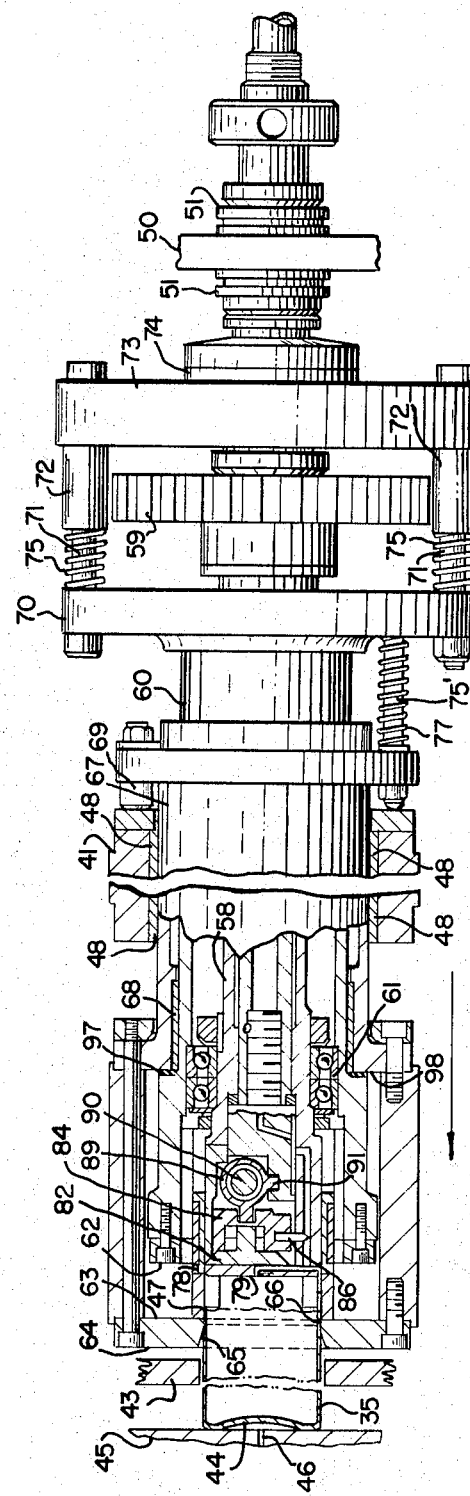
FIGURE 5 is a view similar to FIGURE 4 and illustrates the apparatus of FIGURE 1 in another operating position thereof.

While the various features of this invention are hereinafter described and illustrated as being particularly adaptable for trimming the open end of a cup-shaped container body, it is to be understood that the various features of this invention can be utilized singly or in any combination thereof to provide cutting or trimming means for other devices or the like.

Therefore, this invention is not to be limited to only the embodiments illustrated in the drawings, because the drawings are merely utilized to illustrate one of the wide variety of uses of this invention.

Referring now to FIGURE 1, the prior art container body is generally indicated by the reference numeral 30 and has an open end defined by annular flange 31 having a trim burr 32 formed on the inside thereof because the container body 30 had its open end trimmed by trimming means that cut through the exterior surface thereof into the interior surface thereof.

When the conventional closure means 33 is utilized with the container body 30, it can be seen that the sealing compound or gasket 34 carried by the closure 33 will be cut into by the burr 32 when the closure 33 and flange 31 are subsequently clamped and curled together to provide a sealed container.

However, according to the teachings of this invention, an improved method and apparatus is provided for trimming the open end of a container body or the like wherein the trimming means cuts into the interior surface of the container body toward the exterior surface thereof whereby the resulting burr will be on the outside of the container body and cannot adversely affect the sealing compound or gasket between the container body and the end closure therefor.

In particular, reference is made to FIGURE 2 wherein a container body 35 of this invention has an annular flange 36 at the open end thereof with the annular flange 36 havig the trim burr 37 thereof disposed on the outer surface thereof so that the same cannot cut into the sealing compound or gasket 38 carried by the end closure 39 utilized to subsequently seal closed the container body 35 in a conventional manner.

The apparatus and method of forming the trimmed container body 35 of this invention will now be described and reference is made to FIGURE 3 wherein the apparatus of this invention is generally indicated by the reference numeral 40.

While the apparatus 40 of this invention can be utilized in any suitable manner, the embodiment thereof illustrated in FIGURE 3 has the apparatus 40 mounted in a substantially horizontal position whereby the apparatus 40 can axially move relative to a stationary frame means 41 carried by a suitable support means 42, the stationary frame means 41 telescopically carrying the apparatus 40.

The untrimmed container bodies 35 can be serially brought into registration with the apparatus 40 by any suitable mechanism, such as a rotatable star wheel 43 wherein each container body 35 is adapted to have the closed end 44 thereof held against a backup plate 45 of the star wheel 43 by a vacuum being imposed on the closed end 44 of the container body 35 from a vacuum port 46 in the backup plate 45.

In this manner, as each container body 35 is indexed into alignment with the apparatus 40, the bottom wall 44 of the container body 35 is held in a fixed position relative to the apparatus 40 so that when the apparatus 40 performs its trimming operation of the open end 47 of the container body 35 in a manner hereinafter described, the container body 35 will have a standard height which will be uniform with the heights of all the other container bodies 35 subsequently trimmed by the apparatus 40 in a manner hereinafter described.

As illustrated in FIGURES 3 and 4, the apparatus 40 is axially movable in the stationary frame means 41 because of sleeve bearing means 48 carried by the frame means 41.

An axially movable and rotatable shaft 49 is adapted to be rotated relative to a cam operated member 50 mounted on the shaft 49 by bearing means 51 so that the member 50 can be moved axially by a cam arm 52, FIGURE 3, having one end 53 attached to the cam member 50 and the other end 54 thereof receivable in a slot 55 of a cam wheel 56 rotated in any suitable manner so that rotation of the cam wheel 56 causes axial back and forth movement of the apparatus 40 in a manner hereinafter described, the cam wheel 56 being rotatable on a cam drive shaft 57.

The male knife operating shaft 49 is axially movable relative to a main inner spindle 58 which is adapted to be rotated by a gear wheel 59 driven in any suitable manner, the main inner spindle 58 supporting a non-rotatable tube-like member 60 by bearing means 61. The tube-like member 60 has a front plate 62 adapted to abut against the inside surface 63 of a female knife means 64 in a manner hereinafter described.

The female knife 64 has an aperture 65 passing therethrough and defining a cutting edge 66 with the surface 63 thereof. The female knife 64 is carried by a sleeve means 67 adapted to move axially relative to the tube 60 because of bearing means 68 carried by the sleeve means 67, the sleeve means 67 carrying fixed stops 69 for a purpose hereinafter described.

The tube 60 has an annular flange means 70 affixed thereto and carrying pin means 71 which project into tubular members 72 carried by a member 73 rotatably secured to the shaft 49 by bearing means 74. Compression springs 75 are disposed between the member 70 and tubular portions 72 of the member 73 to tend to separate the two to the position illustrated in FIGURE 4.

The sleeve means 67 also carries pin means 75′ projecting through suitable apertures 76 in the member 70, compression springs 77 being disposed between the sleeve means 67 and the member 70 to tend to separate the two to the position illustrated in FIGURE 4.

The female knife 64 rotatably carries a stripping collar 78 which is splined to the inner spindle 58 in the manner illustrated in FIGURE 10A whereby the stripper collar 78 is adapted to rotate with the spindle 58 and be held from moving axially relative therewith for a purpose hereinafter described.

Figure 6:
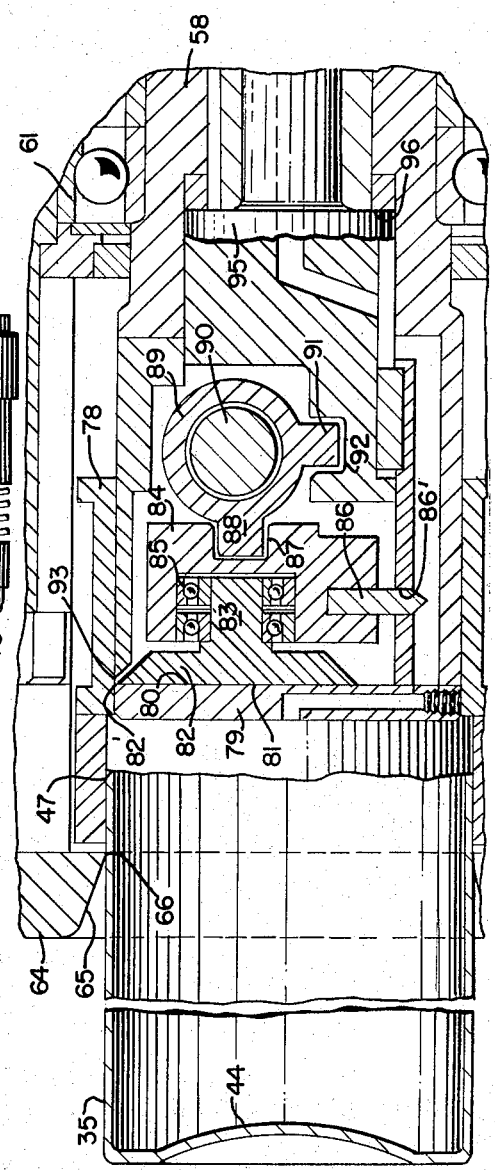
FIGURE 6 is an enlarged, fragmentary, cross-sectional view of the apparatus illustrated in FIGURE 5.

As more fully illustrated in FIGURE 6, the inner spindle 58 includes a front plate 79 that has a rear surface 80 against which a front surface 81 of a disc-like male knife 82 abuts, the male knife 82 having a shaft-like portion 83 rotatably mounted in a carrier 84 by bearing means 85 and having a cutting edge 82′ defined by a bevelled surface cooperating with the surface 81 thereof.

The carrier 85 is attached to the sleeve 58 by a projection means 86 projecting into a slot 86′ in the sleeve 58, the carrier 85 having a cavity 87 receiving a projection 88 of a bell crank member 89 rotatably mounted on a shaft-like means 90 of the sleeve 58 for a purpose hereinafter described.

The member 89 has another projection 91 receivable in a cavity 92 of the shaft means 49 for a purpose hereinafter described.

Thus, when the shaft means 49 is moved axially relative to the sleeve 58 in a manner hereinafter described, the same will cause pivoting movement of the member 89 whereby the projection 88 will cause the male knife 82 to move upwardly in FIGURE 6 to project outwardly through an opening 93 of the inner spindle 58 for a trimming operation in a manner hereinafter described.

The operation of the apparatus 40 will now be described.

As illustrated in FIGURES 3 and 4, the apparatus 40 is in its "at rest" position when the star wheel 43 brings an untrimmed container body 35 into axial alignment with the apparatus 40 in the manner illustrated in FIGURE 4, the end 44 of the container body 35 being held against the backup plate 45 by means of the vacuum port 46 in any suitable manner.

Thereafter, the cam wheel 56 is rotated in such a manner that the member 50 in FIGURE 4 is moved to the left to simultaneously move the shaft-like member 49, the main inner spindle 58, outer sleeve or tube 60 and sleeve means 67 to the left in unison because of the compression springs 77 and 75.

However, as the female knife 64 is being moved to the left, the same receives the untrimmed end 47 of the container body 35 in the aperture 65 thereof in the manner illustrated in FIGURE 5.

When the outer sleeve means 67 has moved to the left from the position illustrated in FIGURE 4 to the position illustrated in FIGURE 5, it can be seen that the stops 69 thereof abut against the right side of the stationary frame means 41 in the manner illustrated in FIGURE 5 whereby further movement of the female knife 64 to the left toward the backup plate 45 is prevented. At this position of the female knife 64, it can be seen that the same will always be maintained a predetermined distance from the backup plate 45 during the subsequent trimming operation whereby the distance between the backup plate 45 and the cutting edge 66 of the female knife 64 will provide a uniform length or height for container body 35 in a manner now to be described.

With the outer sleeve means 67 now held from further movement to the left, the member 50 is continued to be moved to the left by the cam wheel 56 whereby the shaft-like member 49, main inner spindle 58 and tubular member 60 continue to move to the left in unison toward the container body 35 as the springs 77 are being compressed by relative movement between the outer sleeve 67 and member 70 carried by the sleeve means 60.

As the shaft-like member 49, main inner spindle 58 and sleeve-like means 60 continue to move to the left, the sleeve-like means 58 is telescoped into the open end 47 of container body 35 in the manner illustrated in FIGURE 7 until the plate-like member 62 on the sleeve means 60 abuts the inside surface 63 of the stationary female knife 64 in the manner illustrated in FIGURE 7 whereby it can be seen that the inside surface 80 of the plate 79 of the sleeve 58 is now disposed coplanar with the inside surface 63 of the female knife 64 for a purpose hereinafter described.

Once the sleeve means 60 has bottomed against the surface 63 of the female knife 64, the sleeve 60 and main inner spindle 58 cannot be moved further to the left even though the member 50 is continuing to move the shaft-like member 49 to the left as illustrated in FIGURES 9 and 10 because the compression springs 75 can be further compressed.

As the shaft-like member 49 moves axially to the left with the sleeve-like member 58 being held in its most leftward position as illustrated in FIGURE 7, the shaft-like member 49 rotates the member 89 in a clockwise direction as illustrated in FIGURES 9 and 10 whereby the same forces the male knife 82 radially outwardly so that the same can cooperate with the cutting surface 66 of the female knife 64 and trim an annular ring from the end 47 of the container body 35. In this manner, the container body 35 will have a uniform height with the trim burr thereof being disposed on the outer edge of the trimmed end thereof in the manner provided in FIGURE 2 for the purpose previously described.

Since the tube 58 is rotating, it can be seen that the radially outwardly moved male knife 82 will completely cut around the entire internal peripheral surface of the container body 35 while being adapted to rotate relative to the main inner spindle 58 on the bearing means 85 previously described whereby the trimmed part 94 of the container body 35 will be completely sheared from the container body 35 by the surface 81 of the male knife 82 cooperating with the surface 63 of the female knife 64.

After the part 94 has been trimmed from the end 47 of the container body 35 in the manner illustrated in FIGURES 9 and 10, the cam wheel 56 causes the member 50 to begin to move back to the right whereby the shaft-like member 49 begins to move to the right and, through the member 89, radially moves inwardly the knife 82 to the position illustrated in FIGURE 6 whereby a shoulder 95, FIGURE 10, of the shaft-like member 49 abut against a shoulder 96 of the main inner spindle 58 to move the main inner spindle 58 and tubular member 60 therewith to the right whereby the trimmed part 94 is carried with the main inner spindle 58 until the same abuts against the stripper collar 78 and is stripped therefrom as the main inner spindle 58 assumes the position illustrated in FIGURE 6. In this manner, the trimmed part 94 will fall from the apparatus 40 through a suitable slot or chute provided therein to be ejected from the apparatus 40. If desired, compressed air can be utilized to assist the ejection of the trimmed part 94 from the apparatus 40.

The shaft-like member 49, main inner spindle 58 and tube 60 continue to move to the right under the influence of the cam wheel 56 until a shoulder 97 of the male knife positioning fork and tube 60 abuts against a shoulder 98 of the sleeve 67 to cause the sleeve 67 to further move in unison therewith back to the position illustrated in FIGURE 4 whereby the star wheel 43 can advance the trimmed container body 35 to a new position while bringing an untrimmed container body 35 into alignment with the apparatus 40 to be trimmed in the manner previously described.

Therefore, it can be seen that the apparatus 40 of this invention is readily adaptable to move the female knife and male knife relative to a container body to effectively trim the open end of that container body in such a manner that the trim burr is formed on the outside surface of the container body whereby the trim burr will not adversely affect a subsequent closure sealing operating thereon. Further, the apparatus 40 trims the end of a container body in such a manner that the trimmed container body will have a uniform height.

Figure 11:
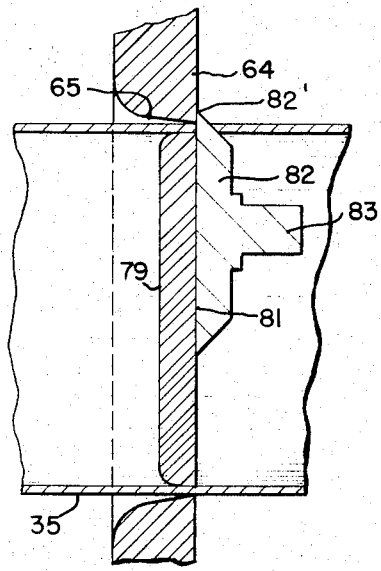
FIGURE 11 is a schematic view illustrating the shear cut provided by the apparatus of FIGURE 3.
Figure 12:
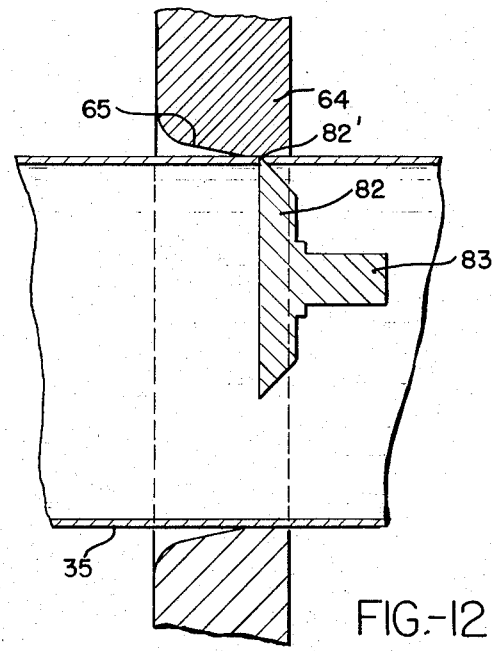
FIGURE 12 is a view similar to FIGURE 11 and illustrates how the apparatus of FIGURE 3 can be utilized to provide a score cut.

While the apparatus 40 has heretofore been described as providing a shear cut with the male knife 82 cooperating with the female knife 64 in the manner illustrated schematically in FIGURE 11, it is to be understood that the male knife 82 could cooperate with the female knife 64 in such a manner that the same provides a score cut in the manner illustrated in FIGURE 12.

Figure 13:
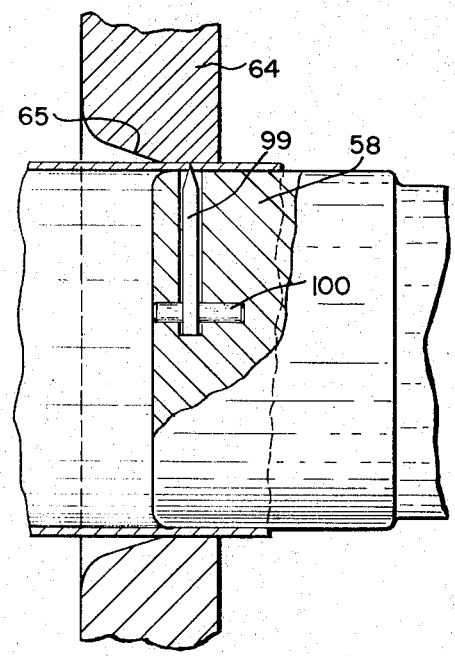
FIGURE 13 is a view similar to FIGURE 11 and illustrates how the apparatus of FIGURE 3 can provide a cycle cut.
Figure 14:
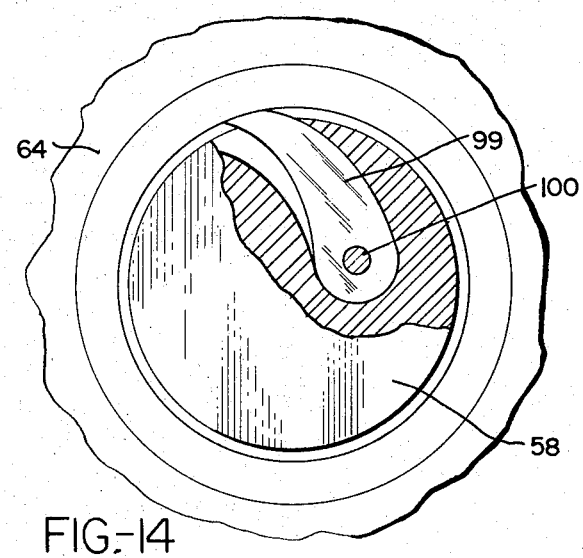
FIGURE 14 is a broken-away front view of the apparatus illustrated in FIGURE 13.

In addition, the apparatus 40 of this invention could be modified so that the same provides a cycle cut by having a male knife 99 pivotally mounted to the main inner spindle 58 by pivot pin means 100 whereby when the spindle 58 is rotated in position, the male knife 99 moves outwardly under centrifugal force in the manner illustrated in FIGURES 13 and 14 to provide either a score cut as illustrated in FIGURE 12 or a shear cut as illustrated in FIGURE 11.

Another apparatus and method of this invention for trimming the open end of a container body or the like is generally indicated by the reference numeral 101 in FIGURE 15 and is axially movable relative to a stationary frame means 102' carried by the support means 42 previously described whereby the star wheel 43 can serially bring untrimmed container bodies 35 into axial alignment therewith in the manner illustrated in FIGURE 15.

The apparatus 101 includes an axially movable shaft-like member 102 rotatably mounted in a sleeve-like member 103 by bearing means 104, the shaft-like member 102 having a plate 105 mounted on the end therewith and having an inner surface 106.

An annular male knife 107 is mounted on the shaft-like member 102 adjacent the surface 106 of the plate 105 by means of a resilient sleeve 108 carried by a retainer 109 on the shaft-like member 102, the male knife 107 having a cutting edge 110 cooperable with a cutting edge 111 of a female knife 112 carried by a sleeve 113 axially movable on bearing means 114 of the stationary frame means 102. The sleeve 113 also carries a stripper collar 115 adapted to receive the male knife 107 in the manner illustrated in FIGURES 15 and 16.

The sleeve 103 is adapted to be rotated relative to the shaft-like member 102 by a gear wheel 116 splined thereto by spline means 117 and carries a sleeve 118 mounted thereto by thrust bearing means 119 and movable axially relative to the sleeve 113 in bearing means 120 carried by the sleeve 113.

The sleeve 113 carries a plate-like member 121 carrying stop means 122 adapted to abut against a shoulder 123 of the stationary frame means 102' for a purpose hereinafter described. The plate-like member 121 carries axially movable plungers 121A held in engagement with the shoulder 123 of the stationary frame means 102 by compression springs 121B whereby the springs 121B tend to maintain the plate-like member 121 away from the stationary frame means 102. The plate-like member 121 has a plurality of apertures 124 passing therethrough and receiving pin means 125 carried by a plate-like member 126 mounted to the shaft-like member 102, the plate-like member 126 being rotatably mounted relative to the spindle 103 by bearing means 127.

The pin-like means 125 carry tubular members 128 having shoulders 129 normally spaced from the plate-like member 121 for a purpose hereinafter described.

A non-rotatable plate-like member 130 is adapted to be interconnected to the end 53 of the cam operated rod 52 of FIGURE 3 for a purpose hereinafter described, the member 130 being mounted on the spindle 103 by bearing means 131.

The member 130 carries pin-like means 132 projecting through suitable apertures 133 in the plate-like member 126, compression springs 134 being disposed between the plate-like member 126 and enlarged ends 135 of the pin-like means 132 for a purpose hereinafter described.

The tubular member or spindle 103 has a beveled collar 136 rotatably mounted on an annular eccentric portion 137 thereof by bearing means 138, the beveled collar 136 having a beveled surface 139 adapted to cooperate with the beveled surface 140 of the male knife 107 in a manner hereinafter described.

The operation of the apparatus 101 will now be described.

As illustrated in FIGURE 15, the apparatus 101 is in its "at rest" position whereby the star wheel 43 can advance an untrimmed container body 35 into axial alignment with the apparatus 101 in the manner illustrated in FIGURE 15 whereby the bottom wall 44 of the container body 35 is held against the backup plate 45 by the vacuum source being interconnected to the port 46 in the plate 45.

Thereafter, the cam wheel 56 rotates to move the member 130 to the left in FIGURE 15 toward the backup plate 45 whereby the shaft-like member 102 and spindle 103 move in unison therewith until the ends 129 of the tubular members 128 abut against the plate-like member 121 in the manner illustrated in FIGURE 17 whereby the inside surface 106 of the plate 105 of the male knife 107 is disposed coplanar with the inside surface 141 of the female knife 112 in the manner illustrated in FIGURES 17 and 18.

When the ends 129 of the tubular members 128 are disposed against the plate-like member 121 in the manner illustrated in FIGURE 17, further movement of the member 130 to the left toward the backup plate 45 moves not only the shaft-like member 102 and spindle 103 and its associated sleeve 118, but also the outer sleeve 113 in opposition to the springs 121B whereby the female knife 112 is telescoped over the end 47 of the container body 35 by means of the aperture 142 thereof while the male knife 107 is telescopically received in the open end 47 of the container body 35 in the manner illustrated in FIGURES 19 and 20.

The female knife 112 and male knife 107 are respectively telescoped relative to the container body 35 until the stop means 122 on the plate-like member 121 abut against the shoulder 123 of the stationary frame means 102' in the manner illustrated in FIGURE 19 whereby further movement of the shaft-like member 102 and the outer sleeve 113 is prevented. In this manner, the inside surface 111 of the female knife 112 is positively located relative to the backup plate 45 so that the container body, when trimmed, will have a fixed uniform height.

With the male knife 107 and female knife 112 now positioned in the manner illustrated in FIGURE 19, further movement of the member 130 to the left causes the spindle 103 to move in unison therewith while the springs 134 compress so that the beveled surface 139 on the collar 136 will wedge against the surface 140 of the male knife 107 and, through the rotating eccentric portion 137 of the spindle 103, cause the male knife 107 to oscillate outwardly relative to the container body 35 to trim the same in the manner fully illustrated in FIGURES 21 and 22.

After the oscillating knife 107 has completely trimmed an annular portion 94 from the container body 35 in the manner illustrated in FIGURES 21 and 22, the cam wheel 56 now begins to move the member 130 back to the right whereby the spindle 103 moves in unison therewith to withdraw the surface 139 of the collar 136 thereof sufficiently from the surface 140 of the male knife 107 to permit the male knife 107 to move inwardly to the position illustrated in FIGURE 23 while carrying the trimmed part 94 thereon.

The spindle 103 moves by itself back to the right until the end 143 thereof abuts against the plate-like member 126, such movement of the spindle 103 permits the male knife 107 to move inwardly so that the same can subsequently clear the stripping collar 115.

When the end 143 of the spindle 103 abuts the plate 126, further movement of the member 130 back to the right carries with it the plate 126 and, thus, the shaft-like member 102 so that the shaft-like member 102 and spindle 103 move backwardly to the position illustrated in FIGURE 15 whereby the trimmed part 94 is stripped from the male knife 107 by the stripping collar 115 in the manner illustrated in FIGURE 24, the stripped and trimmed part 94 being then free to fall by gravity from the apparatus 101 as illustrated in FIGURE 25 or be forced therefrom by compressed air or the like.

When the sleeve 103 has moved back to the right to cause a shoulder 144 on the sleeve 118 thereof to abut against a shoulder 145 on the sleeve 113, the sleeve 113 moves in unison therewith to carry the female die member 112 back to the position illustrated in FIGURE 15 so that the trimmed container 35 can be indexed away from the apparatus 101 by the star wheel 43, the star wheel positioning a new untrimmed container body 35 in alignment with the apparatus 101 to be trimmed in the manner previously described.

Therefore, it can be seen that the apparatus 30 and 101 of this invention are each adapted to trim the open end of a container body so that the container body will have a uniform height and will have the trim burr thereof formed on the outside thereof whereby the trim burr will not adversely affect a subsequent closure sealing operation.

Further, it is to be understood that suitable air pressure can be sent through the shaft-like members 49 and 102 of the apparatus 30 and 101 of this invention to be directed into the open end of the container body 35 to positively hold the same against the backup plate 45 during the trimming operation.

It will be noted that the containers trimmed in accordance with the present invention do not rotate while they are being trimmed. Consequently, the internal and external scoring problems usually associated with conventional trimmers are eliminated. This provides a neater and more sanitary container as well as the elimination of scrap material.

Therefore, it can be seen that not only does this invention provide an improved apparatus for trimming an open end of a container body or the like, but also this invention provides an improved method of trimming such a container body or the like.

While the form of the invention now preferred has been disclosed as required by the statutes, other forms may be used, all coming within the scope of the claims which follow.

What is claimed is:

1. Apparatus for trimming an annulus from the end of a cylindrical container body or the like comprising a single head, means for causing relative movement between said head and said end of said container body to telescope the same for said trimming operation and to untelescope the same after said trimming operation, said head including female means for telescopically receiving said end of said body, said head including a male knife means receivable in said end of said body, and means for moving said male knife means outwardly and relative to said female means to completely trim said annulus from said end of said body while said male knife means in said out position and said female means remains stationary relative to said knife means.

2. Apparatus as set forth in claim 1 and including means for stripping said trimmed annulus from said male knife means.

3. Apparatus for trimming an annulus from the end of a cylindrical container body or the like comprising a head, said head including female means for telescopically receiving said end of said body, said head including a male knife means receivable in said end of said body, said head including a stripping collar carried by said female means, means for moving said male knife means outwardly to trim said annulus from said end of said body, and means for moving said male knife means into telescoping relation with said collar to strip said annulus from said male knife means.

4. Apparatus as set forth in claim 3 wherein said male knife means is rotatable and rotates said collar therewith.

5. Apparatus as set forth in claim 4 wherein said collar is splined to said male knife means.

6. Apparatus for trimming an annulus from the end of a cylindrical container body or the like comprising a single head, means for causing relative movement between said head and said end of said container body to telescope the same for said trimming operation and to untelescope the same after said trimming operation, said head including a female knife means for telescopically receiving said end of said body, said head including a male knife means movable relative to said female knife means and being receivable in said end of said body, and means for moving said male knife means outwardly and relative to said female knife means to cooperate with said female knife means to completely trim said annulus from said end of said body while said male knife means is in said out position and said female knife means remains stationary relative to said male knife means.

7. Apparatus as set forth in claim 6 wherein said male knife means cooperates with said female knife means to produce a shear cut on said container body.

8. Apparatus as set forth in claim 6 wherein said male knife means cooperates with said female knife means to produce a score cut on said container body.

9. Apparatus as set forth in claim 6 wherein said male knife is moved outwardly to cut said container body by centrifugal force.

10. Apparatus for trimming an annulus from the end of a cylindrical container body or the like comprising a head, said head including a female knife means for telescopically receiving said end of said body, said head including a male knife means movable relative to said female knife means and being receivable in said end of said container body, said head including a stripping collar carried by said female knife means, means for moving said male knife means outwardly to cooperate with said female knife means to trim said annulus from said end of said body, and means for moving said male knife means into telescoping relation with said collar to strip said annulus from said male knife means.

11. Apparatus for trimming an annulus from the end of a cylindrical container body or the like comprising a single head, means for causing relative movement between said head and said end of said container body to telescope the same for said trimming operation and to untelescope the same after said trimming operation, said head including female means for telescopically receiving said end of said body, said head including a male knife means receivable in said end of said body, means for moving said male knife means radially outwardly to cut into the interior surface of said body, and means for rotating said male knife means in its out position to completely trim said annulus from said body while said female means remains stationary relative to said male knife means.

12. Apparatus for trimming an annulus from the end of a cylindrical container body or the like comprising a single head, means for causing relative movement between said head and said end of said container body to telescope the same for said trimming operation and to untelescope the same after said trimming operation, said head including female means for telescopically receiving said end of said body, said head including a male knife means receivable in said end of said body, means for moving said male knife means radially outwardly to cut into the interior surface of said body, and means for locating said male knife means in its out position to trim said annulus from said body, said male knife means being moved radially outwardly by a bell-crank member forming part of said head.

13. Apparatus as set forth in claim 11 wherein said male knife means comprises a disc-like member.

14. Apparatus for trimming an annulus from the end of a cylindrical container body or the like comprising a single head, means for causing relative movement between said head and said end of said container body to telescope the same for said trimming operation and to untelescope the same after said trimming operation, said head including female means for telescopically receiving said end of said body, said head including a male knife means receivable in said end of said body, means for moving said male knife means radially outwardly to cut into the interior surface of said body, and means for oscillating said male knife means in its out position to completely trim said annulus from said body while said female means remains stationary relative to said male knife means.

15. Apparatus as set forth in claim 14 wherein said male knife means is moved radially outwardly by an eccentric portion of said head.

16. Apparatus as set forth in claim 14 wherein said male knife means comprises an annular member.

17. Apparatus for trimming an annulus from the end of a cylindrical container body or the like comprising a frame means, a movable head carried by said frame means, said head including a female knife means having stop means engageable with said frame means to limit movement of said female knife means in one direction over said container body, said head including male knife means telescopically receivable in said container body and having stop means engageable with said female knife means to limit insertion of said male knife means into said body, said male knife means including a male knife radially movable relative to said female knife means, said male knife means including an operating shaft for moving said male knife radially outwardly to trim said annulus from said body after said male knife means has been inserted into said body.

18. Apparatus as set forth in claim 17 wherein said male knife means includes a bell crank member interconnecting said male knife with said shaft.

19. Apparatus as set forth in claim 17 wherein a stripping collar is carried by said female knife means.

20. Apparatus as set forth in claim 19 wherein said collar is rotatably carried by said female knife means and is splined to said male knife means.

21. Apparatus for trimming an annulus from the end of a cylindrical container body or the like comprising a frame means, a movable head carried by said frame means, said head including a female knife means having stop means engageable with said frame means to limit movement of said female knife means in one direction over said container body, said head including male knife means telescopically receivable in said container body and having stop means engageable with said female knife means to limit the position of said male knife means relative to said female knife means, said male knife means including an annular male knife mounted on a first shaft means, said male knife means including a second shaft means having eccentric means for oscillating said male knife in an off center relation relative to said first shaft means to trim said annulus from said body after said female and male knife means have telescoped with said container body.

22. Apparatus as set forth in claim 21 wherein a resilient collar is disposed between said male knife and said first shaft mans.

23. Apparatus as set forth in claim 21 wherein said second shaft means has an eccentric portion rotatably mounting a collar thereon.

24. Apparatus as set forth in claim 23 wherein said collar has a beveled surface cooperable with a beveled surface on said male knife.

25. Apparatus as set forth in claim 21 wherein a stripping collar is carried by said female knife means.

26. Apparatus for trimming an annulus from the end of a cylindrical container body or the like comprising a frame means, a movable head carried by said frame means, said head including a female knife means having stop means engageable with said frame means to limit movement of said female knife means in one direction over said container body, said head including male knife means telescopically receivable in said container body and having stop means to limit insertion of said male knife means into the interior of said body relative to the stopped position of the female knife means, said male knife means including a male knife radially movable relative to said female knife means, said male knife means including an operating shaft for moving said male knife radially outwardly to trim said annulus from said body after said male knife means has been inserted into said body.

References Cited

UNITED STATES PATENTS

| | | | |
|---|---|---|---|
| 1,622,253 | 3/1927 | Putt | 82—82 X |
| 1,807,671 | 6/1931 | Phelps | 82—82 X |
| 2,342,246 | 2/1944 | Brueckner | 82—82 |
| 2,443,963 | 6/1948 | Ricciardi | 82—82 |
| 3,175,439 | 3/1965 | Russell et al. | 83—54 X |

FOREIGN PATENTS 818,366  8/1959  Great Britain.

HARRISON L. HINSON, *Primary Examiner.*

WILLIAM S. LAWSON, *Examiner.*